United States Patent [19]

Zvonar

[11] Patent Number: 4,763,905
[45] Date of Patent: Aug. 16, 1988

[54] SEAL RETENTION AND ANTI-ROTATION LOCKING ASSEMBLY

[75] Inventor: Robert F. Zvonar, Osceola, Ind.

[73] Assignee: Allied-Signal Inc., Morristown, N.J.

[21] Appl. No.: 129,034

[22] Filed: Dec. 4, 1987

[51] Int. Cl.⁴ .................... F16J 15/32; F16J 15/34
[52] U.S. Cl. .................... 277/38; 277/47; 277/50; 277/95; 384/478; 384/484
[58] Field of Search .................... 277/25, 38–43, 277/47–51, 88–90, 95; 384/139–141, 147, 148, 478, 481, 482, 484

[56] References Cited

U.S. PATENT DOCUMENTS

| | | | |
|---|---|---|---|
| 1,387,087 | 8/1921 | White et al. | |
| 1,958,907 | 5/1934 | Brouwer. | |
| 2,017,076 | 10/1935 | Sauzedde | 301/6 |
| 2,096,293 | 10/1937 | Avery | 301/6 |
| 2,353,988 | 7/1944 | Batesole et al. | 384/478 X |
| 2,629,571 | 2/1953 | Wolf | 244/103 |
| 2,867,462 | 1/1959 | Nielsen. | |
| 2,935,860 | 5/1960 | Miller | 277/95 X |
| 3,245,735 | 4/1966 | Sikora | 308/187.1 |
| 3,424,406 | 1/1969 | Rumsey et al. | 244/103 |
| 3,430,896 | 3/1969 | Labrecque | 244/103 |
| 3,768,881 | 10/1973 | Bender et al. | 384/484 |
| 3,790,178 | 2/1974 | Cameron | 277/95 |
| 3,870,384 | 3/1975 | Ladin | 277/95 X |
| 4,333,694 | 6/1982 | Howe, Jr. | 308/187.2 |

FOREIGN PATENT DOCUMENTS 372620 7/1939 Italy.

Primary Examiner—Robert S. Ward
Attorney, Agent, or Firm—Larry J. Palguta; Ken C. Decker

[57] ABSTRACT

A seal retention and anti-rotation locking assembly (20) positioned within an aircraft wheel hub (10). The wheel hub (10) has a plurality of eccentric grooves (24) disposed about the periphery of an opening (12), the eccentric grooves (24) receiving therein complementary-shaped retaining ring segments (22). A grease seal (40) extends between the periphery of the opening (12) and an axle member (14), and is anchored securely by means of the retaining ring segments (22) and fasteners (28). The eccentric shape of the grooves (24) prevents deformation of the retaining ring segments (22) and release of the seal (40) while maintaining grease at bearings (16) located between the hub (10) and axle member (14).

4 Claims, 2 Drawing Sheets

SEAL RETENTION AND ANTI-ROTATION LOCKING ASSEMBLY

The present invention relates generally to a seal retention assembly, in particular to a grease seal retention and anti-rotation locking assembly.

Aircraft wheels are typically mounted by means of roller bearings upon an aircraft axle. The roller bearings are lubricated with grease, and in order to retain the grease at the bearings, an annular seal extends radially inwardly between the periphery of the wheel hub opening and a stationary axle member. Prior constructions have suffered from the problem of an annular snap ring, which is utilized to hold the seal axially in place, bending or coning axially outwardly due to dynamic forces and permitting the grease seal to disengage and rotate in the wheel housing. The present invention provides a solution to this problem by providing a retaining ring that is divided into three segments, each of which is mounted and received in an eccentric groove formed at the opening of the wheel hub. The retaining ring segments each have a central opening which receives a fastener that extends into a threaded insert in the seal. Each retaining ring segment, fastener, and threaded insert, comprises an assembly that securely positions and anchors in place the seal so that it does not disengage from its seat and rotate within the wheel housing.

The present invention is a seal retention and anti-rotation locking assembly, comprising a wheel hub having an opening, the periphery of the opening including a plurality of eccentric grooves disposed about the periphery of the opening, a plurality of retaining ring segments each disposed in a respective eccentric groove, sealing means disposed within the opening and extending radially between the periphery of said open and a non-rotating axle member, the sealing means including a plurality of inserts each located circumferentially in alignment with a retaining ring segment, and fastening means extending between each retaining ring segment and the insert in order to retain the sealing means in engagement with the wheel hub.

One way of carrying out the invention is described in detail with reference to the drawings which illustrate an embodiment in which.

Figure 1:
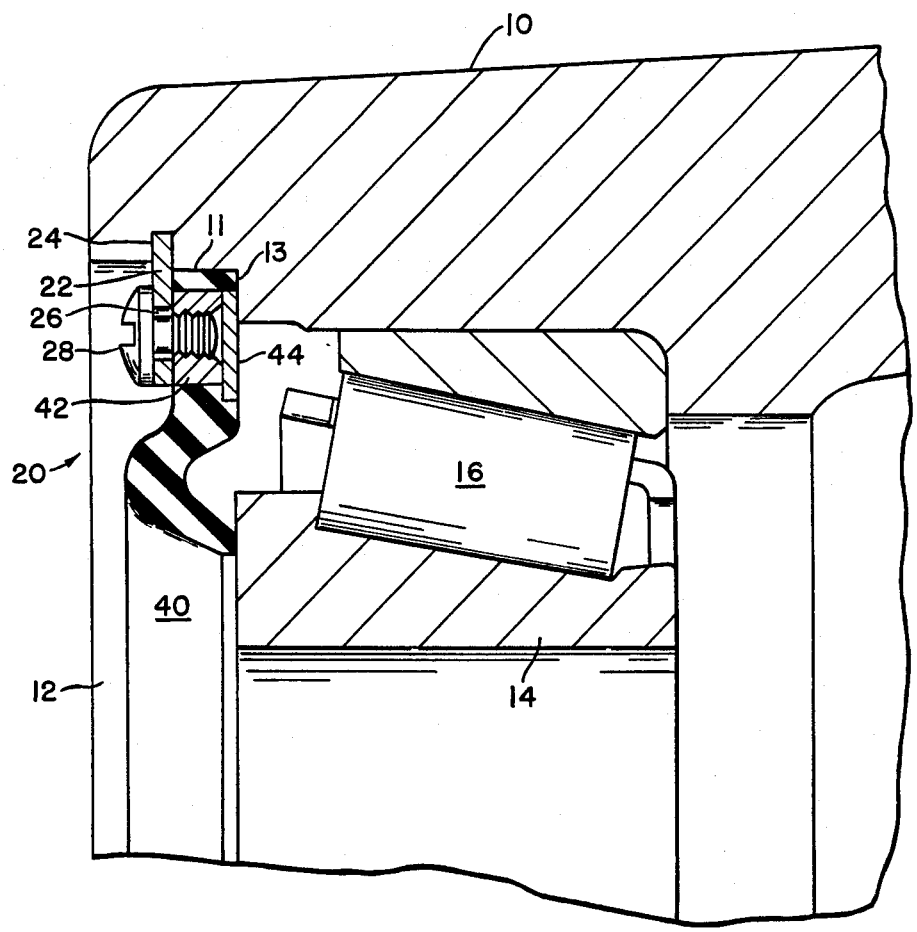
FIG. 1 is a section view of the wheel hub and bearing assembly.
Figure 2:
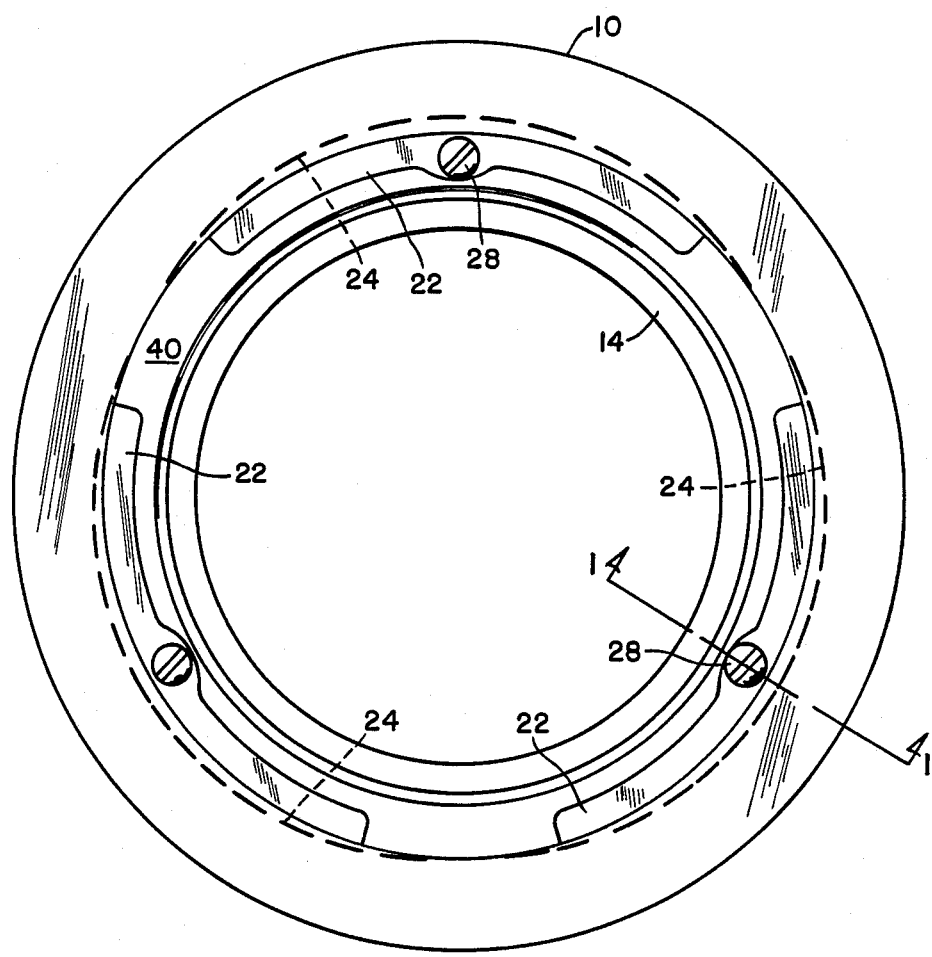
FIG. 2 is an end view of the wheel hub.

FIG. 1 illustrates in cross-section a wheel hub 10 that is circular in shape and which includes a central opening 12. Disposed within the opening is an axle (not shown), a nonrotatable axle member 14, bearing means 16, and a seal retention and anti-rotation locking assembly designated generally by reference numeral 20. The assembly 20 comprises a plurality of retaining ring segments 22, in this case three, each of which is received within a complementary shaped eccentric groove 24 located about in the periphery of opening 12. The retaining ring segments 22 each have a through opening 26 for a fastener or screw 28. An annular seal 40 extends radially between the shoulder 11 of hub 10 and axle member 14. Seal 40 includes a plurality of threaded inserts 42 backed by an annualr steel member 44. The annular member 44 is insert molded in seal 40 and provides reinforcement. Insert 42 is welded to member 44. Threaded fastener 28 is received within retaining ring segment 22 at the circumferential location where the eccentric groove 24 has its greatest radial depth. The fastener 28 extends through opening 26 and is received threadedly within threaded insert 42. As a result, the retaining ring segment resists bending that might otherwise be caused by dynamic forces, and fastener 28 ensures that the outer radial periphery of seal 40 remains in position against shoulders 11 and 13 of wheel hub 10. Thus, seal 40 remains in proper axial position, cannot break free and rotate within the wheel housing, and ensures that grease disposed about bearing means 16 is not permitted to flow away.

It is to be understood that modifications can be made without departing from the scope of the invention. Other provisions of the invention or variations will become apparent to those skilled in the art and will suggest themselves from the specific applications of the invention. It is intended that such variations and revisions of the invention, as are to be expected on the part of those skilled in the art, to suit individual design preference and which incorporate the herein disclosed principles, will be included within the scope of the following claims as equivalents thereof.

I claim:

1. A seal retention and anti-rotation locking assembly, comprising a wheel hub having an opening, the periphery of the opening including a plurality of eccentric grooves disposed about the periphery of the opening, a plurality of retaining ring segments each disposed in a respective eccentric groove, sealing means disposed within the opening and extending radially between the periphery of said opening and a non-rotating axle member, the sealing means including a plurality of inserts each located circumferentially in alignment with a retaining ring segment, and fastening means extending between each retaining ring segment and the insert in order to retain the sealing means in engagement with the wheel hub.

2. The assembly in accordance with claim 1, wherein the insert comprises a threaded insert, and each retaining ring segment includes an opening receiving the fastening means therethrough.

3. The assembly in accordance with claim 2, wherein the sealing means includes an annular member abutting each insert and disposed axially opposite the respective retaining ring segment.

4. The assembly in accordance with claim 3, wherein the plurality of retaining ring segments comprises three retaining ring segments disposed about the periphery of the opening of said wheel hub.

* * * * *